United States Patent
Haridas et al.

(10) Patent No.: US 10,855,462 B2
(45) Date of Patent: Dec. 1, 2020

(54) SECURE IN-BAND UPGRADE USING KEY REVOCATION LISTS AND CERTIFICATE-LESS ASYMMETRIC TERTIARY KEY PAIRS

(71) Applicant: Honeywell International Inc., Morris Plains, NJ (US)

(72) Inventors: Harshal S. Haridas, Jamison, PA (US); Michal Hojsik, Prague (CZ); Jiri Findejs, Prague (CZ); Lukas Pohanka, Prague (CZ)

(73) Assignee: Honeywell International Inc., Morris Plains, NJ (US)

( * ) Notice: Subject to any disclaimer, the term of this patent is extended or adjusted under 35 U.S.C. 154(b) by 330 days.

(21) Appl. No.: 15/614,170

(22) Filed: Jun. 5, 2017

(65) Prior Publication Data
US 2017/0359171 A1    Dec. 14, 2017

Related U.S. Application Data

(60) Provisional application No. 62/350,037, filed on Jun. 14, 2016.

(51) Int. Cl.
*H04L 9/08* (2006.01)
*G06F 21/57* (2013.01)

(52) U.S. Cl.
CPC ............ *H04L 9/0891* (2013.01); *G06F 21/57* (2013.01); *G06F 21/575* (2013.01); *H04L 9/08* (2013.01)

(58) Field of Classification Search
CPC ......... H04L 9/0891; H04L 9/08; G06F 21/57; G06F 21/575
See application file for complete search history.

(56) References Cited

U.S. PATENT DOCUMENTS

| | | |
|---|---|---|
| 6,243,695 B1 | 6/2001 | Assaleh et al. |
| 6,560,656 B1 | 5/2003 | O'Sullivan et al. |
| 6,983,994 B2 | 1/2006 | Pino |
| 6,990,379 B2 | 1/2006 | Gonzales et al. |
| 7,284,278 B2 | 10/2007 | Anson et al. |
| 7,657,946 B2 | 2/2010 | Yan |
| 8,381,306 B2 | 2/2013 | McPherson et al. |

(Continued)

FOREIGN PATENT DOCUMENTS

EP    2741228 A2    6/2014

OTHER PUBLICATIONS

Omote et. al "Simple Certificateless Signature with Smart Cards", 2008 IEEE/IFIP International Conference on Embedded and Ubiquitous Computing (Year: 2008).*

(Continued)

*Primary Examiner* — Eleni A Shiferaw
*Assistant Examiner* — Bassam A Noaman

(57) ABSTRACT

A method includes securely booting a device using a bootloader, where the bootloader is digitally signed using a first cryptographic key associated with the bootloader. The method also includes executing one or more kernel or user applications using the device, where the one or more kernel or user applications are digitally signed using one or more second cryptographic keys associated with the one or more kernel or user applications. In addition, the method includes using an in-band channel to update or replace the first cryptographic key.

14 Claims, 7 Drawing Sheets

(56) References Cited

U.S. PATENT DOCUMENTS

| | | | |
|---|---|---|---|
| 8,429,435 | B1 | 4/2013 | Clayton et al. |
| 8,873,746 | B2 | 10/2014 | Long et al. |
| 9,038,162 | B2 | 5/2015 | Hagiu et al. |
| 9,152,794 | B1* | 10/2015 | Sanders ............... G06F 21/575 |
| 2003/0061481 | A1 | 3/2003 | Levine et al. |
| 2003/0088650 | A1 | 5/2003 | Fassold et al. |
| 2004/0015262 | A1 | 1/2004 | Brown et al. |
| 2004/0153171 | A1 | 8/2004 | Brandt et al. |
| 2004/0177264 | A1 | 9/2004 | Anson et al. |
| 2005/0102514 | A1 | 5/2005 | Bergenwall et al. |
| 2005/0251680 | A1 | 11/2005 | Brown et al. |
| 2005/0256735 | A1 | 11/2005 | Bayne |
| 2006/0095771 | A1* | 5/2006 | Appenzeller ........... H04L 9/006 713/171 |
| 2006/0282876 | A1 | 12/2006 | Shelest et al. |
| 2007/0067634 | A1 | 3/2007 | Siegler |
| 2007/0283443 | A1 | 12/2007 | McPherson et al. |
| 2009/0031409 | A1* | 1/2009 | Murray ................ H04N 21/462 726/10 |
| 2009/0177289 | A1 | 7/2009 | Glanzer et al. |
| 2009/0276537 | A1 | 11/2009 | Deverick et al. |
| 2010/0050267 | A1 | 2/2010 | Nochta |
| 2010/0070743 | A1 | 3/2010 | Grigor et al. |
| 2010/0161817 | A1 | 6/2010 | Xiao et al. |
| 2011/0132427 | A1 | 6/2011 | Kalkanoglu et al. |
| 2011/0231450 | A1 | 9/2011 | Sinha et al. |
| 2012/0117380 | A1 | 5/2012 | Herberth et al. |
| 2012/0174182 | A1 | 7/2012 | Neely |
| 2012/0266214 | A1 | 10/2012 | Hagiu et al. |
| 2013/0111211 | A1 | 5/2013 | Winslow et al. |
| 2013/0198799 | A1 | 8/2013 | Staggs et al. |
| 2014/0007253 | A1 | 1/2014 | Hardt |
| 2014/0089651 | A1* | 3/2014 | Yao ....................... H04L 9/3247 713/2 |
| 2014/0331064 | A1 | 11/2014 | Ballesteros |
| 2015/0215338 | A1 | 7/2015 | Haridas et al. |
| 2015/0215339 | A1 | 7/2015 | Chemoguzov et al. |
| 2015/0244742 | A1 | 8/2015 | Reynolds et al. |
| 2016/0087801 | A1 | 3/2016 | Jones et al. |
| 2016/0127133 | A1* | 5/2016 | Pinder .................. H04L 9/3268 713/176 |

OTHER PUBLICATIONS

International Search Report and Written Opinion of the International Searching Authority for International Application No. PCT/US2017/036407 dated Oct. 13, 2017, 12 pages.

Foreign Communication From a Related Counterpart Application, PCT Application No. PCT/US2015/015337, International Search Report dated Apr. 28, 2015, 3 pages.

Foreign Communication From a Related Counterpart Application, PCT Application No. PCT/US2015/015337, Written Opinion dated Apr. 28, 2015, 4 pages.

"How IPSec Works," How IPSec Works: Security Policy; Security Services, Mar. 28, 2003, 31 pages.

"IPSec," Wikipedia, the free encyclopedia, http://en.wikipedia.org/w/index.php?title=IPsec&oldid=619949512#Encapsulating_Security_Payload, Aug. 5, 2014, 10 pages.

Foreign Communication From a Related Counterpart Application, European Application No. 14192912.5-1870, Extended European Search Report dated Jun. 15, 2015, 7 pages.

Croft, B., et al., "Boostrap Protocol (BOOTP)," RFC 951, Sep. 1985, 12 pages.

Alexander, S., et al., "DHCP Options and BOOTP Vendor Extensions," RFC 2132, Mar. 1997, 34 pages.

"Bootsrap Protocol," Wikipedia, the free encyclopedia, http://en.wikipedia.org/w/index.php?title=Boostrap_Protocol&oldid=599915347, Mar. 16, 2014, 3 pages.

Foreign Communication From a Related Counterpart Application, PCT Application No. PCT/US2015/011937, International Search Report dated Apr. 28, 2015, 3 pages.

Foreign Communication From a Related Counterpart Application, PCT Application No. PCT/US2015/011937, International Search Report dated Apr. 28, 2015, 6 pages.

Sanders, L., "Secure Boot in the Zynq-7000 All Programmable SoC," White Paper: Zynq-7000 AP SoC, XILINX, WP426 (v1.0) Apr. 5, 2013, 10 pages.

Sanders, L., "Secure Boot iof Zynq-7000 All Programmable SoC," Application Note: Zynq-7000 AP SoC, XILINX, XAPP1175 (v2.0) Apr. 3, 2015, 85 pages.

U.S. Appl. No. 14/954,550, Specification filed Nov. 30, 2017, 28 pages.

U.S. Appl. No. 14/954,550, filed Nov. 30, 2017, Non-Final Office Action dated May 4, 2017, 23 pages.

* cited by examiner

SECURE IN-BAND UPGRADE USING KEY REVOCATION LISTS AND CERTIFICATE-LESS ASYMMETRIC TERTIARY KEY PAIRS

CROSS-REFERENCE TO RELATED APPLICATION AND PRIORITY CLAIM

This application claims priority under 35 U.S.C. § 119(e) to U.S. Provisional Patent Application No. 62/350,037 filed on Jun. 14, 2016. This provisional application is hereby incorporated by reference in its entirety.

TECHNICAL FIELD

This disclosure relates generally to secure booting techniques for computing devices. More specifically, this disclosure relates to secure in-band upgrade using key revocation lists and certificate-less asymmetric tertiary key pairs.

BACKGROUND

Various computing systems support the ability to securely boot those systems. In these conventional computing systems, firmware typically checks that a bootloader is signed with a cryptographic key authorized in a database, where the database is contained in hardware that is set up in a factory. With adequate signature verification in next-stage bootloaders, kernel spaces, and user spaces, it is possible to prevent the execution of unauthorized code during the boot process.

From a user's point of view, a computing system that is securely booting simply stops working when confronted with a tampered boot path until either (i) the secure boot process is disabled or (ii) a properly signed next-stage bootloader is made available. Recovery of the computing system typically occurs through a non-standard method since the stopped system usually needs to be accessed by a user in close proximity to the stopped system using an out-of-band channel. Some computing systems provide an ability to disable the secure boot process as part of a "backdoor" access method, but this creates a vulnerability that could be exploited.

SUMMARY

This disclosure provides secure in-band upgrade using key revocation lists and certificate-less asymmetric tertiary key pairs.

In a first embodiment, a method includes securely booting a device using a bootloader, where the bootloader is digitally signed using a first cryptographic key associated with the bootloader. The method also includes executing one or more kernel or user applications using the device, where the one or more kernel or user applications are digitally signed using one or more second cryptographic keys associated with the one or more kernel or user applications. In addition, the method includes using an in-band channel to update or replace the first cryptographic key.

In a second embodiment, a system includes at least one memory configured to store a bootloader and one or more kernel or user applications. The bootloader is digitally signed using a first cryptographic key associated with the bootloader, and the one or more kernel or user applications are digitally signed using one or more second cryptographic keys associated with the one or more kernel or user applications. The system also includes at least one processor configured to securely boot the system using the bootloader, execute the one or more kernel or user applications, and use an in-band channel to update or replace the first cryptographic key.

In a third embodiment, a non-transitory computer readable medium contains instructions that when executed cause at least one processor to securely boot a device using a bootloader, where the bootloader is digitally signed using a first cryptographic key associated with the bootloader. The medium also contains instructions that when executed cause the at least one processor to execute one or more kernel or user applications using the device, where the one or more kernel or user applications are digitally signed using one or more second cryptographic keys associated with the one or more kernel or user applications. The medium further contains instructions that when executed cause the at least one processor to use an in-band channel to update or replace the first cryptographic key.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
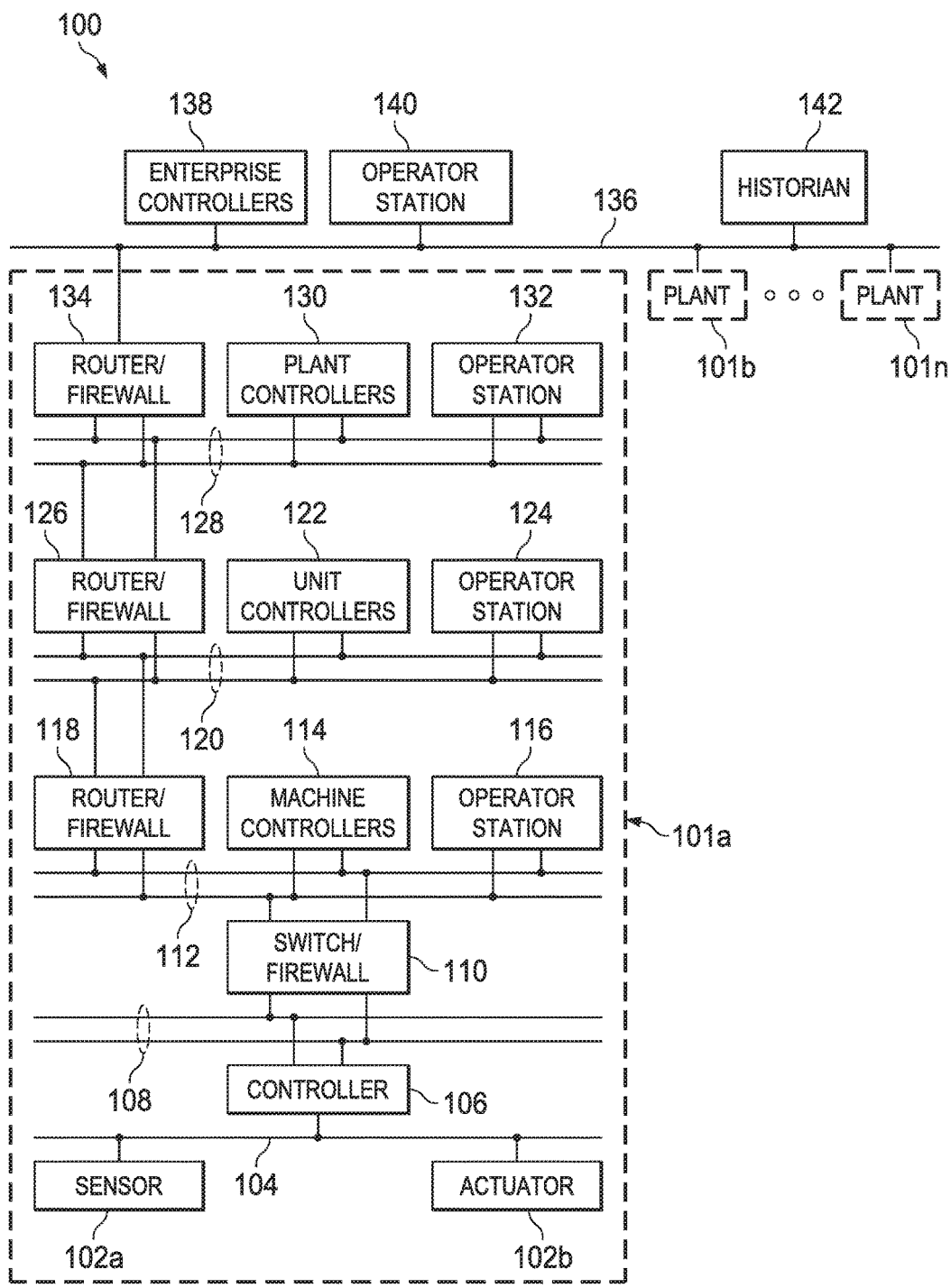
FIG. 1 illustrates an example industrial process control and automation system according to this disclosure.

FIGS. 1 through 11, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Industrial process control and automation systems are routinely having to employ increasing levels of security defense mechanisms to protect against cyber-security threats. Among other reasons, these systems have evolved from closed proprietary systems in the early 1990s to more convenient, connected, and open systems now. The current trend involves (i) moving these systems to cloud computing environments and (ii) using industrial Internet of things (IIoT) devices within these systems.

While these shifts provide increased convenience, improved connectivity, and improved productivity, such devices and systems are more vulnerable to exploits. This is due to their increased connectivity to external networks and to more widespread knowledge about open system vulnerabilities. To mitigate these concerns, security architectures began mandating perimeter security and security hardened nodes. However, the introduction of virtual platforms with remote access support has further required additional security countermeasures to prevent unauthorized accesses and system privilege gains by unauthorized individuals.

Complex malware like StuxNet in 2010 and Flame in 2012 again changed the security landscape for industrial control and automation systems. After these security threats became known, embedded devices came to the forefront of security discussions. It was around this time that the ability to enable secure booting and the ability to run verified (signed) firmware started gaining importance.

As described above, during a secure boot of a computing system, firmware typically checks that a bootloader is signed with a cryptographic key authorized in a database, where the database is contained in hardware that is set up in a factory. With adequate signature verification in next-stage bootloaders, kernel spaces, and user spaces, it is possible to prevent the execution of unauthorized code during the boot process.

While these conventional approaches can be useful in various situations, these approaches typically operate under the assumption that signing cryptographic keys are properly safeguarded. Conventional approaches therefore typically do not support a mechanism to securely transition from existing cryptographic keys to new cryptographic keys when the existing keys are compromised or otherwise need to be replaced. In order to resolve this problem, multiple independent cryptographic keys for firmware signing could be used. However, this approach may not be feasible in some systems. For example, this approach could require that computing systems have knowledge of all keys ahead of time (which consumes additional memory and code logic complexity during runtime in the computing systems) or that physical access to each computing system is available in order to manually transition to new keys using out-of-band mechanisms.

In industrial control and automation systems or other systems, the assumption that cryptographic keys are manually safeguarded tends to be inaccurate, and manual transition of systems using multiple independent keys can be problematic given the geographic extent of the systems and the need to access the systems manually. Conventional approaches can become impractical and expensive in situations where large numbers of devices are deployed across large geographic areas, some of which may be hard to access manually.

This disclosure provides solutions to these and other problems by providing new approaches for firmware signing and secure booting that allow a secure transition to new cryptographic keys. In some embodiments, this is accomplished by defining a firmware signing architecture using primary, secondary, and tertiary keys. The architecture separates bootloader signing keys (secondary) from kernel and user application signing keys (tertiary). A bootloader, being a highly valuable asset, can be digitally signed using one or more secondary keys, which could be stored on a hardware security module (HSM) like a "smart card" or other device. The HSM could be accessed using a dedicated sign server. Kernel and user space applications can be signed using tertiary keys, such as those located on other HSMs locally available for individuals at different software manufacturing or production sites. At least one key revocation list (KRL) can be included with a bootloader to handle situations like lost, expired, or broken HSMs that are controlled by humans at software manufacturing or production sites. The architecture also provides an ability to limit the number of keys revoked and an ability to rollover a secondary key to allow an empty KRL.

These approaches help to overcome a number of problems associated with conventional secure booting solutions. For example, the signing of a bootloader is separated from the signing of the rest of the firmware (such as kernel and user applications), which allows revocation and replacement of a bootloader key. These approaches also support a technique to revoke tertiary keys and limit the KRL size by allowing a bootloader key rollover capability. Thus, a convenient and secure mechanism over regular (in-band) channels can be achieved to upgrade a large number of embedded devices located at remote locations.

In the following description, these approaches are described as being implemented as part of or within an industrial process control and automation system. However, these approaches are not limited to use in industrial process control and automation systems and could find use in a wide range of systems.

FIG. 1 illustrates an example industrial process control and automation system 100 according to this disclosure. As shown in FIG. 1, the system 100 includes various components that facilitate production or processing of at least one product or other material. For instance, the system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system.

One or more networks 104 are coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS network), a pneumatic control signal network, or any other or additional type(s) of network(s).

In the Purdue model, "Level 1" includes one or more controllers 106, which are coupled to the network 104. Among other things, each controller 106 may use the measurements from one or more sensors 102a to control the operation of one or more actuators 102b. Each controller 106 includes any suitable structure for controlling one or more aspects of a process system. As a particular example, each controller 106 could represent a computing device running a real-time operating system.

Redundant networks 108 are coupled to the controllers 106. The networks 108 facilitate interaction with the controllers 106, such as by transporting data to and from the controllers 106. The networks 108 could represent any suitable redundant networks. As particular examples, the networks 108 could represent a pair of Ethernet networks or a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as a pair of Ethernet networks or an FTE network.

In the Purdue model, "Level 2" may include one or more machine-level controllers 114 coupled to the networks 112. The machine-level controllers 114 perform various functions to support the operation and control of the controllers 106, sensors 102a, and actuators 102b, which could be associated with a particular piece of industrial equipment (such as a boiler or other machine). For example, the machine-level controllers 114 could log information collected or generated by the controllers 106, such as measurement data from the sensors 102a or control signals for the actuators 102b. The machine-level controllers 114 could also execute applications that control the operation of the controllers 106, thereby controlling the operation of the actuators 102b. In addition, the machine-level controllers 114 could provide secure access to the controllers 106. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS operating system. Although not shown, different machine-level controllers 114 could be used to control different pieces of equipment in a process system (where each piece of equipment is associated with one or more controllers 106, sensors 102a, and actuators 102b).

One or more operator stations 116 are coupled to the networks 112. The operator stations 116 represent computing or communication devices providing user access to the machine-level controllers 114, which could then provide user access to the controllers 106 (and possibly the sensors 102a and actuators 102b). As particular examples, the operator stations 116 could allow users to review the operational history of the sensors 102a and actuators 102b using information collected by the controllers 106 and/or the machine-level controllers 114. The operator stations 116 could also allow the users to adjust the operation of the sensors 102a, actuators 102b, controllers 106, or machine-level controllers 114. In addition, the operator stations 116 could receive and display warnings, alerts, or other messages or displays generated by the controllers 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system.

At least one router/firewall 118 couples the networks 112 to two networks 120. The router/firewall 118 includes any suitable structure for providing communication between networks, such as a secure router or combination router/firewall. The networks 120 could represent any suitable networks, such as a pair of Ethernet networks or an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running a MICROSOFT WINDOWS operating system. Although not shown, different unit-level controllers 122 could be used to control different units in a process system (where each unit is associated with one or more machine-level controllers 114, controllers 106, sensors 102a, and actuators 102b).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as a pair of Ethernet networks or an FTE network.

In the Purdue model, "Level 4" may include one or more plant-level controllers 130 coupled to the networks 128. Each plant-level controller 130 is typically associated with one of the plants 101a-101n, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101a-101n and to control various aspects of the plants 101a-101n. The enterprise-level controllers 138 can also perform various functions to support the operation and control of components in the plants 101a-101n. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS operating system. In this document, the term "enterprise" refers to an organization having one or more plants or other processing facilities to be managed. Note that if a single plant 101a is to be managed, the functionality of the enterprise-level controller 138 could be incorporated into the plant-level controller 130.

Access to the enterprise-level controllers 138 may be provided by one or more operator stations 140. Each of the operator stations 140 includes any suitable structure for supporting user access and control of one or more components in the system 100. Each of the operator stations 140 could, for example, represent a computing device running a MICROSOFT WINDOWS operating system.

A historian 142 is also coupled to the network 136 in this example. The historian 142 could represent a component that stores various information about the system 100. The historian 142 could, for example, store information used during production scheduling and optimization. The historian 142 represents any suitable structure for storing and facilitating retrieval of information. Although shown as a single centralized component coupled to the network 136, the historian 142 could be located elsewhere in the system 100, or multiple historians could be distributed in different locations in the system 100.

One or more of the devices shown in FIG. 1 could support secure booting and the techniques described in this patent document for secure in-band upgrade using key revocation lists and certificate-less asymmetric tertiary key pairs. For example, any of the controllers, operator stations, or other computing devices shown in FIG. 1 (or added to FIG. 1 according to particular needs) could support the techniques described in this patent document.

Although FIG. 1 illustrates one example of an industrial process control and automation system 100, various changes may be made to FIG. 1. For example, industrial control and automation systems come in a wide variety of configurations. The system 100 shown in FIG. 1 is meant to illustrate one example operational environment in which secure in-band upgrade using key revocation lists and certificate-less asymmetric tertiary key pairs may be needed or desired. However, FIG. 1 does not limit this disclosure to any particular configuration or operational environment. In general, the techniques described in this patent document can be used in any suitable system, and that system need not relate to industrial process control or automation.

Figure 2:
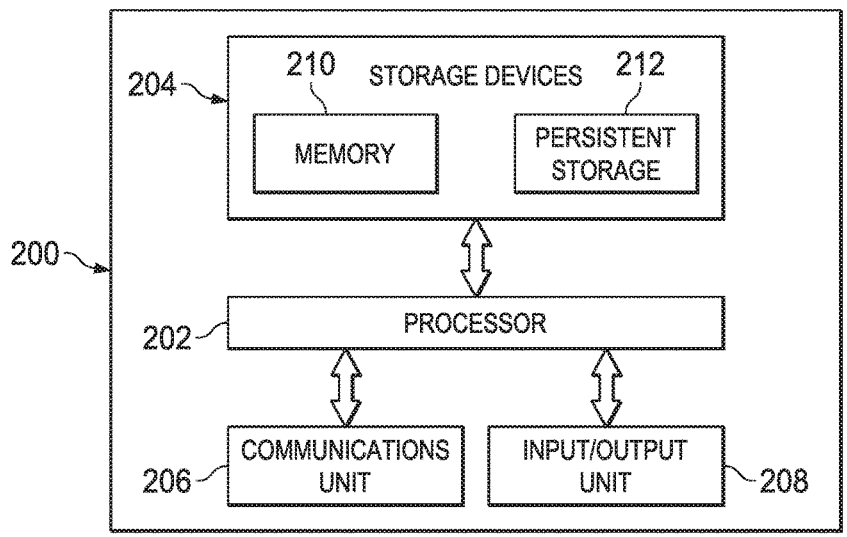
FIG. 2 illustrates an example computing device supporting secure in-band upgrade using key revocation lists and certificate-less asymmetric tertiary key pairs according to this disclosure.

FIG. 2 illustrates an example computing device 200 supporting secure in-band upgrade using key revocation lists and certificate-less asymmetric tertiary key pairs according to this disclosure. The device 200 could, for example, represent any of the computing devices shown in FIG. 1 and described above. However, the device 200 could represent any other suitable computing system where secure booting and secure in-band upgrade using key revocation lists and certificate-less asymmetric tertiary key pairs may be needed or desired.

As shown in FIG. 2, the device 200 includes at least one processor 202, at least one storage device 204, at least one communications unit 206, and at least one input/output (I/O) unit 208. Each processor 202 can execute instructions, such as those that may be loaded into a memory 210. Each processor 202 denotes any suitable processing device, such as one or more microprocessors, microcontrollers, digital signal processors, application specific integrated circuits (ASICs), field programmable gate arrays (FPGAs), or discrete circuitry.

The memory 210 and a persistent storage 212 are examples of storage devices 204, which represent any structure(s) capable of storing and facilitating retrieval of information (such as data, program code, and/or other suitable information on a temporary or permanent basis). The memory 210 may represent a random access memory or any other suitable volatile or non-volatile storage device(s). The persistent storage 212 may contain one or more components or devices supporting longer-term storage of data, such as a read only memory, hard drive, Flash memory, or optical disc.

The communications unit 206 supports communications with other systems or devices. For example, the communications unit 206 could include at least one network interface card or wireless transceiver facilitating communications over at least one wired or wireless network. The communications unit 206 may support communications through any suitable physical or wireless communication link(s).

The I/O unit 208 allows for input and output of data. For example, the I/O unit 208 may provide a connection for user input through a keyboard, mouse, keypad, touchscreen, or other suitable input device. The I/O unit 208 may also send output to a display, printer, or other suitable output device.

Although FIG. 2 illustrates one example of a device 200 supporting secure in-band upgrade using key revocation lists and certificate-less asymmetric tertiary key pairs, various changes may be made to FIG. 2. For example, various components in FIG. 2 could be combined, further subdivided, or omitted and additional components could be added according to particular needs. Also, computing devices can come in a wide variety of configurations, and FIG. 2 does not limit this disclosure to any particular configuration of computing device.

The following describes example techniques for secure in-band upgrade using key revocation lists and certificate-less asymmetric tertiary key pairs. Note that the details provided below relate to specific implementations of these techniques, and other embodiments could be implemented in any other suitable manner in accordance with the teachings of this disclosure. For example, while specific hardware products from specific manufacturers, specific computer commands, and specific numerical values may be described below, these hardware products, commands, and numerical values are examples only.

Secure booting can mitigate several attack vectors that are typically exploited to attack computing devices. For example, memory-based exploits can be used to gain code execution on a target device. Gain persistence can occur by writing exploit code to a persistent storage of a target device. Specific examples of this include bootkits (exploits that execute as part of a low level system boot process), rootkits (exploits that execute as part of an operating system), and viruses (exploits that execute as regular, potentially privileged applications or system services). Gain persistence can also occur by manipulating software images offline, such as direct Flash memory rewrites. Secure booting of a device can be used to mitigate all of these attack vectors, but runtime validation of software is difficult and expensive. Hence, a combination of signed firmware and secure boot capabilities are used as described below to help prevent these or other exploits.

Some devices, such as integrated system on a chip (SoC) products like the XILINX ZYNQ-7000 ALL PROGRAMMABLE SOC, support a secure boot process using two pairs of encryption keys. The pairs of keys include a primary secret key (PSK) and a primary public key (PPK), as well as a secondary secret key (SSK) and a secondary public key (SPK). In some embodiments, these keys could represent RSA 2048-bit keys. These types of devices could also support a particular sequence of operations during a secure boot process. For example, assume that a bootloader of a device contains at least two executable partitions, including a first-stage bootloader (FSBL) and a second-stage bootloader (SSBL). During a secure boot, the device could support a chain of trust that progresses from code in a BootROM memory through the first-stage bootloader, the second-stage bootloader, an operating system, and any kernel or user applications.

To build the chain of trust, a hash of the primary public key could be burned into the device itself, such as by using eFuse technology, during manufacturing. The hash could be denoted as eFUSE.PPKhash. Then, the secondary public key is signed using the primary secret key. The signature could be denoted as SPK.sig. During a build process for a bootloader, all partitions are signed by the secondary secret key, and an authentication certificate (AC) is appended to all partitions and to the BootROM header. Each authentication certificate of a bootloader partition may contain the primary public key, the secondary public key, the SPK.sig signature, and a partition signature Partition.sig. The partition signature Partition.sig is a signature of that partition (or header) as signed using the secondary secret key. For the first-stage bootloader, its authentication certificate can be denoted as FSBL.AC, its primary public key can be denoted as FSBL.PPK and can be stored in FSBL.AC, and its SPK.sig signature can be denoted as FSBL.SPK.sig. Similar nomenclature can be used for the second-stage bootloader.

When referring to an authentication certificate of a bootloader partition, the phrase "bootloader authentication certificate" is used. An example form of a bootloader authentication certificate is shown in Table 1.

TABLE 1

| AC Header |
|---|
| PPK |
| SPK |
| SPK.sig |
| Partition.sig |

The primary secret key and the secondary secret key could be stored on a hardware security module (HSM) like a "smart card" or other device. Access to the primary secret key is highly restricted and could be used only to sign the secondary public key. To sign a partition with the secondary secret key, a sign server service (SSS) can be used. The sign server service can act as a front-end for the secondary secret key stored on the HSM and can offer several services for signing with the secondary secret key.

To add revocation capabilities into the firmware signing process and to separate the bootloader signing from the signing of other (application) images, tertiary keys and key revocation lists are supported. A tertiary key pair includes a tertiary public key (TPK) and a tertiary secret key (TSK). The tertiary secret key is used to sign all product partitions except the bootloader itself. The tertiary secret key is also used to sign a firmware package that includes the bootloader and other partitions. Different individuals, groups, organizations, or other entities (such as different product teams) could have their own unique tertiary key pairs stored on one or more HSMs, and each tertiary public key can be signed using the secondary secret key to form a signature denoted TPK.sig. As a result, a chain of trust can be established from eFUSE.PPKhash via the secondary public key to the tertiary private key.

For all images except the bootloader, the image partitions are signed by the tertiary secret key, and the image's authentication certificate contains the contents shown in Table 2 below. In Table 2, the signature Partition.sig is created using the tertiary secret key.

TABLE 2

| AC Header |
|---|
| SPK |
| TPK |
| TPK.sig |
| Partition.sig |

As noted above, tertiary keys can be stored on HSMs, such as smart cards, and each entity can have its own HSM with a tertiary secret key. The HSM also contains the tertiary public key and the TPK.sig signature.

A key revocation list (KRL) is a list of revoked tertiary public keys. The key revocation list can be used by the second-stage bootloader and a package verifier application to check whether a particular tertiary key used to sign an application partition has been revoked. The key revocation list can be included in a separate partition of the bootloader and can be signed by the secondary secret key. Its integrity can be protected by an appended bootloader authentication certificate in the same way as for other bootloader partitions.

Due to memory limitations or other factors, the number of revoked tertiary keys listed in a key revocation list is upper-bounded. This provides a maximum size for the key revocation list. If the number of revoked tertiary keys approaches or reaches the upper bound, the secondary key pair can be changed as described below to clear out the key revocation list. The previously-revoked tertiary keys would no longer be valid since they were signed using the prior secondary key pair, so only newly-revoked tertiary keys would need to be placed into the new key revocation list. This process is described in more detail below. In some embodiments, a key revocation list could have the format shown in Table 3 below.

TABLE 3

| Name | Value | Size (B) |
| --- | --- | --- |
| Magic value | 'KRL\0' (4B 52 4C 00) | 4 |
| Version | Integer | 4 |
| Header size | Integer (less than 128) | 4 |
| Serial number | Integer | 4 |
| Key count (N) | Integer (less than 60) | 4 |
| | Padded with 0xFF to header size. | |
| Key1 | raw bytes | S |
| ... | | |
| KeyN | raw bytes | S |

All values in Table 3 are in little endian formatting, and the sizes are expressed in bytes. An initial version of the key revocation list could be denoted as version 1 (Version=01 00 00 00), and the key size (S) could be version-dependent (for KRL version 1, S may equal 32). The serial number (KRL.SN) can be increased each time a new key revocation list is issued. The initial key revocation list with no revoked keys could have a serial number equal to zero and could have a key count equal to zero (although the number of revoked keys can differ from the KRL serial number). The size of the header in this example is limited to 128 bytes, and the number of revoked keys in the KRL may not exceed 60 in this example (so the key count is less than or equal to 60). The keys identified in the list could include SHA-256 or other hashes of revoked tertiary public keys, which could denote XILINX-formatted RSA 2048-bit or other public keys (modulus, extension, and exponent). This format can help to limit the KRL size, and no extra hashing may have to be computed during the boot process since the tertiary public key is hashed anyway in order to verify that the TPK.sig signature was signed using the secondary secret key.

In the following discussion, two web services are related to the use of secure boot keys. A sign server service (SSS) is the front-end for HSM-stored secondary secret keys and offers functions for partition signing (DataSigner), KRL signing (KRLSigner), and tertiary public key signing (KeySigner). Also, a key management service (KMS) denotes a service that offers functions for tertiary key management, such as inserting new TPKs, revoking existing TPKs, or listing all TPKs. To support the use of key revocation lists, the key management service has a function (GetKRL) that returns the latest key revocation list. The sign server service and the key management service could be provided by any suitable devices, such as by using one or more computing devices (which could have the architecture shown in FIG. 2, although certain components in FIG. 2 may be excluded if not needed). These services could be provided within a system being secured (such as the system 100) or outside of the system being secured.

Figure 3:
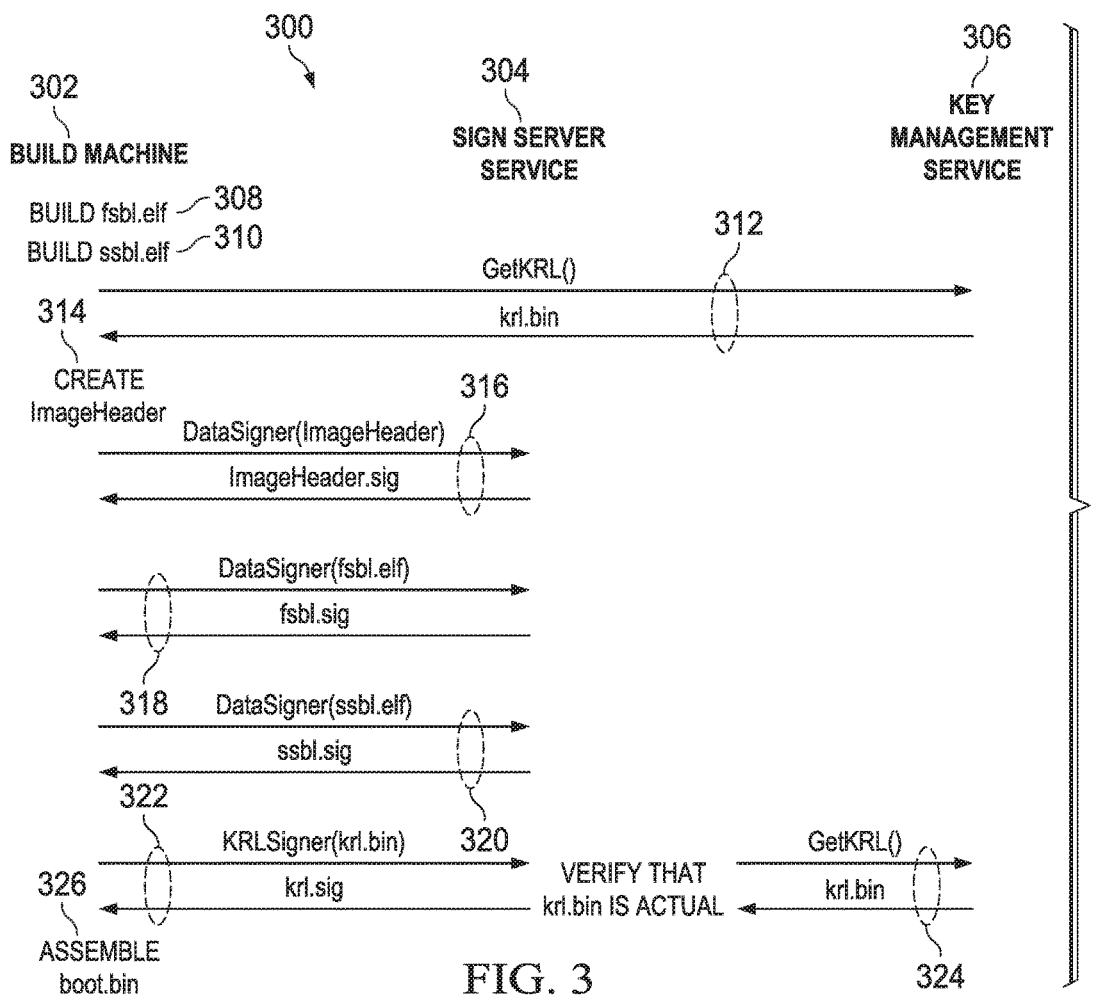
FIG. 3 illustrates an example method for bootloader image signing according to this disclosure.

In general, firmware signing can be divided into image signing (or more precisely image partitions signing) and package signing. The image signing differs for the bootloader image and for other images (application images) since different keys are used. FIG. 3 illustrates an example method 300 for bootloader image signing according to this disclosure. In FIG. 3, the method 300 involves the use of a build machine 302, a sign server service 304, and a key management service 306. The build machine 302 generally denotes a device that performs operations to build a firmware package, which can then be provided to other devices for use. The sign server service 304 and the key management service 306 can implement the functionality described above. In some embodiments, each of the components 302-306 denotes at least one computing device, which could have the same architecture shown in FIG. 2, although certain components in FIG. 2 may be excluded if not needed.

As described above, all bootloader partitions are signed using the secondary secret key. Hence, to sign a bootloader image, the DataSigner and KRLSigner functions of the sign server service 304 and the GetKRL function of the key management service 306 are used. Assume that the primary public key, the secondary public key, and the secondary public key's signature generated using the primary secret key (SPK.sig) are stored locally on the build machine 302. In this process, it is assumed that the bootloader includes two executable partitions (FSBL and SSBL) and a key revocation list. However, this process can easily be extended to more than two executable partitions and/or more than one key revocation list.

As shown in FIG. 3, a first bootloader partition is built into a first file at step 308, and a second bootloader partition is built into a second file at step 310. This could include, for example, the processor 202 of the build machine 302 building the first-stage bootloader into a first Executable and Linkable Format (ELF) file denoted fsbl.elf. This could also include processor 202 of the build machine 302 building the second-stage bootloader into a second ELF file denoted ssbl.elf. A key revocation list is obtained at step 312. This could include, for example, the processor 202 of the build machine 302 calling the GetKRL function of the key management service 306, which returns the requested key revocation list (denoted krl.bin in this example). An image header is generated at step 314. This could include, for example, the processor 202 of the build machine 302 generating the image header using a XILINX bootgen utility.

The image header is signed at step 316. This could include, for example, the processor 202 of the build machine 302 calling the DataSigner function of the sign server service 304, which returns the signature of the image header (denoted ImageHeader.sig) generated using the secondary secret key. The first bootloader partition is signed at step 318. This could include, for example, the processor 202 of the build machine 302 calling the DataSigner function of the sign server service 304, which returns the signature of the first-stage bootloader (denoted fsbl.sig) generated using the secondary secret key. The second bootloader partition is signed at step 320. This could include, for example, the processor 202 of the build machine 302 calling the DataSigner function of the sign server service 304, which returns the signature of the second-stage bootloader (denoted ssbl.sig) generated using the secondary secret key.

The key revocation list is signed at step 322. This could include, for example, the processor 202 of the build machine 302 calling the KRL Signer function of the sign server service 304, which returns the signature of the key revocation list (denoted krl.sig) generated using the secondary secret key. As part of this process, the key revocation list from the build machine is verified at step 324. This could include, for example, the sign server service 304 calling the GetKRL function of the key management service 306, which again returns the requested key revocation list. The sign server service 304 can then verify whether the key revocation list received from the build machine 302 matches the key revocation list received from the key management service 306.

A signed bootloader is assembled at step 326. This could include, for example, the processor 202 of the build machine 302 generating a bootloader file (boot.bin) using the XILINX bootgen utility. The signed bootloader could be assembled using the primary public key, the secondary public key, the secondary public key's signature generated using the primary secret key (SPK.sig), the ELF files (fsbl.elf and ssbl.elf), the key revocation list (krl.bin), and the signatures (ImageHeader.sig, fsbl.sig, ssbl.sig, and krl.sig). In some embodiments, the signatures are placed inside the authentication certificates of the image header and the individual partitions.

Note that all communications between the build machine 302 and the sign server service 304 could be protected, such as by using mutually-authenticated Transport Layer Security (TLS), and may require a dedicated client certificate used for data signing with the secondary secret key. The GetKRL function of the key management service 306 could be called over TLS with only server authentication.

Figure 4:
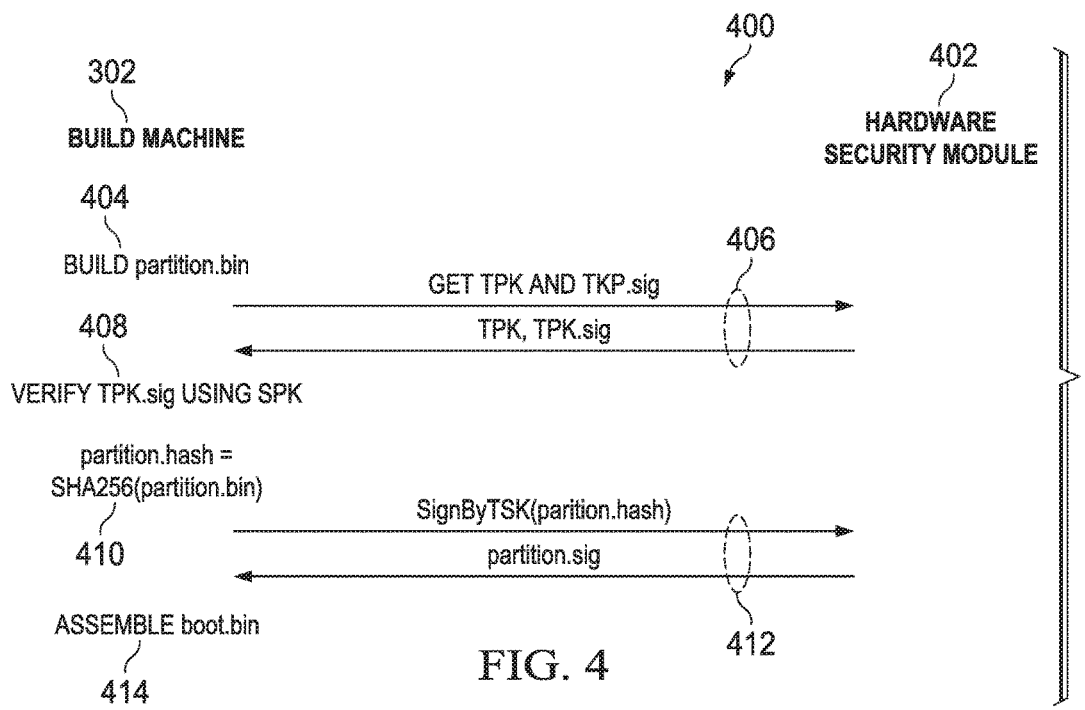
FIG. 4 illustrates an example method for application image signing according to this disclosure.

FIG. 4 illustrates an example method 400 for application image signing according to this disclosure. As noted above, the bootloader image partition is signed using the secondary secret key, while any application image partitions (such as kernel or user application partitions) are signed using a tertiary secret key. Assume that the tertiary secret key is stored on a hardware security module 402 (such as a smart card), together with the tertiary public key and TPK.sig (the signature of the tertiary public key generated using the secondary secret key). Hence, to sign an application image, one has to have a hardware security module 402 with a valid tertiary secret key and have access to the secondary public key (which was assumed to be locally stored on the build machine 302). Also assume that an application image with one partition called partition.bin is being signed.

As shown in FIG. 4, an application image is built into a partition at step 404. This could include, for example, the processor 202 of the build machine 302 building the application image into the partition partition.bin. A tertiary public key and a signature for the tertiary public key are obtained at step 406. This could include, for example, the processor 202 of the build machine 302 requesting the tertiary public key and the tertiary public key's signature TPK.sig from the hardware security module 402. The signature for the tertiary public key is verified at step 408. This could include, for example, the processor 202 of the build machine 302 verifying that the tertiary public key's signature TPK.sig was generated using the secondary secret key based on the secondary public key.

If verified, a hash of the partition is generated at step 410, and the partition is signed at step 412. This could include, for example, the processor 202 of the build machine 302 calculating an SHA-256 hash of the partition. This could also include the processor 202 of the build machine 302 requesting that the hardware security module 402 sign the partition hash using the tertiary secret key stored on the hardware security module 402. The result of the operation is a partition signature partition.sig.

A signed application image is assembled at step 414. This could include, for example, the processor 202 of the build machine 302 assembling the signed application image using the partition partition.bin, the secondary public key, the tertiary public key, and the signatures (TPK.sig and partition.sig). The method 400 of FIG. 4 could be repeated for each application image to be included in a firmware package.

Once a bootloader and one or more application images are signed, a firmware package can be created. The firmware package includes a set of firmware images, such as the bootloader and the application image(s). Note, however, that a firmware package could also include just the application image(s).

Figure 5:
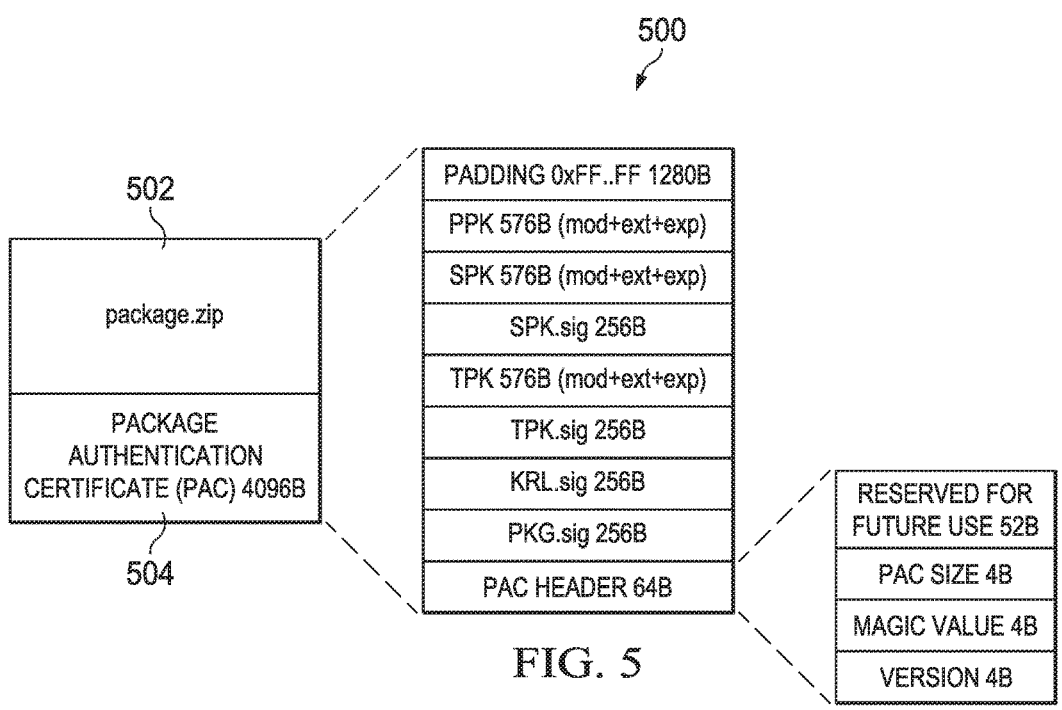
FIG. 5 illustrates an example firmware package according to this disclosure.

FIG. 5 illustrates an example firmware package 500 according to this disclosure. The firmware package 500 can be created and signed at the end of the build processes described above. For example, after all firmware images are built and individually signed as described above, one file (such as a .bin file) containing all images can be created. This file can be zipped together with a text file and a map file that describe the .bin file. To ensure the integrity of the entire firmware package, the zip file can then be signed.

As shown in FIG. 5, a signed firmware package 500 can therefore include one or more zipped firmware images 502 and a package authentication certificate (PAC) 504 appended to the zipped firmware images 502. The joined file could have a file name extension of .pkg. The zipped firmware images 502 can include the signed bootloader image and the signed application image(s).

The package authentication certificate 504 contains information that facilitates verification and use of the zipped firmware images 502. Table 4 below illustrates example contents of a package authentication certificate, and the same contents are also shown in FIG. 5.

TABLE 4

| Name | Comment | Size (B) |
|---|---|---|
| Padding | Reserved for future use, PAC padded to 4 kB | 1280 |
| PPK | Primary Public Key | 576 |
| SPK | Secondary Public Key | 576 |
| SPK.sig | SPK signature by PSK | 256 |
| TPK | Tertiary Public Key | 576 |
| TPK.sig | TPK signature by SSK | 256 |
| KRL.sig | Latest KRL signature by SSK | 256 |
| PKG.sig | Package signature by TSK | 256 |
| PAC footer | Package | 64 |

The package authentication certificate 504 includes a package signature PKG.sig generated using the tertiary secret key. An example package signature header is described in Table 5 and also shown in FIG. 5. All values are in little endian formatting, and the sizes are in bytes.

TABLE 5

| Name | Type | Current Value | Size (B) |
|---|---|---|---|
| Reserved for future use | Byte array | FF . . . FF | 52 |
| PAC size | Integer | 00 0A 00 00 (2560) | 4 |
| Magic value | Byte array | 50 4B 47 53 ('PKGS') | 4 |
| Version | Integer | 01 00 00 00 (1) | 4 |

As described later, verification of the package authentication certificate 504 can be performed by a package verifier application that uses a trusted value of the primary public key. By relying on the primary public key, a rollover of the secondary key pair can occur, such as by using the same process as a normal firmware upgrade.

Note that the package authentication certificate 504 here contains a key revocation list signature (KRL.sig), which denotes the signature of the latest key revocation list. This value is used during package verification. If a production package (such as one without a bootloader) is being verified, the verification process checks that the KRL.sig on the device is the same as the one in the package authentication certificate 504. If not, the device can reject the firmware package 500.

Also note that the contents of Tables 4 and 5 and the contents in FIG. 5 are for illustration only. The package authentication certificate 504 and the package signature header could contain any other suitable fields of information. Also, the fields of information could have any suitable values and sizes.

Figure 6:
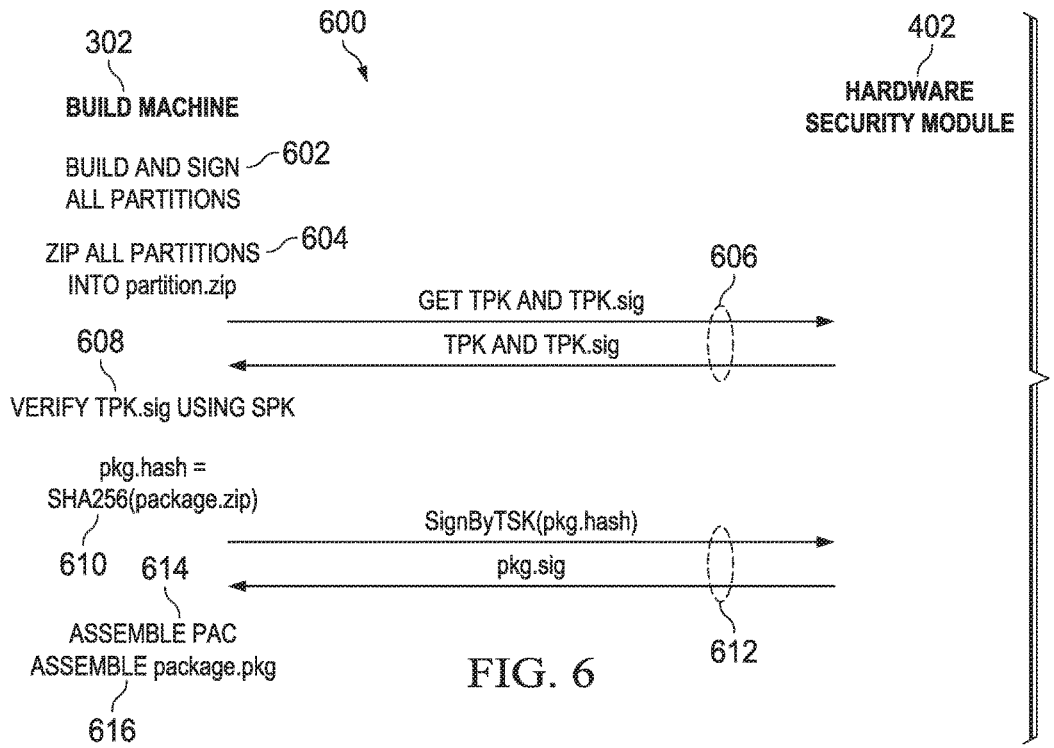
FIG. 6 illustrates an example method for constructing and signing a firmware package according to this disclosure.

FIG. 6 illustrates an example method 600 for constructing and signing a firmware package according to this disclosure. In FIG. 6, a firmware package (such as the firmware package 500) is signed at the end of a build process using a tertiary secret key stored on the hardware security module 402. The hardware security module 402 may also contain the TPK.sig signature, such as in the form of an extension of a self-signed TPK certificate. Other information used for creation of the package authentication certificate 504 (such as the primary public key, the secondary public key, and the SPK.sig and KRL.sig signatures) can be stored locally on the build machine 302.

As shown in FIG. 6, images for a firmware package are built and signed at step 602. This could include, for example, the processor 202 of the build machine 302 performing the operations shown in FIG. 3 to create and sign a bootloader image. This could also include the processor 202 of the build machine 302 performing the operations shown in FIG. 4 to create and sign one or more application images. The images are zipped into a package at step 604. This could include, for example, the processor 202 of the build machine 302 creating a firmware package 500 with one or more zipped firmware images 502.

A tertiary public key and a signature for the tertiary public key are obtained at step 606. This could include, for example, the processor 202 of the build machine 302 requesting the tertiary public key and the tertiary public key's signature TPK.sig from the hardware security module 402. The signature for the tertiary public key is verified at step 608. This could include, for example, the processor 202 of the build machine 302 verifying that the tertiary public key's signature TPK.sig was generated using the secondary secret key based on the secondary public key.

If verified, a hash of the package is generated at step 610, and the package is signed at step 612. This could include, for example, the processor 202 of the build machine 302 calculating an SHA-256 hash of the package. This could also include the processor 202 of the build machine 302 requesting that the hardware security module 402 sign the package hash using the tertiary secret key stored on the hardware security module 402. The result of the operation is a package signature pkg.sig.

A package authentication certificate is assembled at step 614, and the signed package is assembled at step 616. This could include, for example, the processor 202 of the build machine 302 assembling the contents of Table 4 to create the package authentication certificate 504. This could also include the processor 202 of the build machine 302 assembling the signed package package.pkg by appending the package authentication certificate 504 to the zipped firmware images 502.

Figure 7:
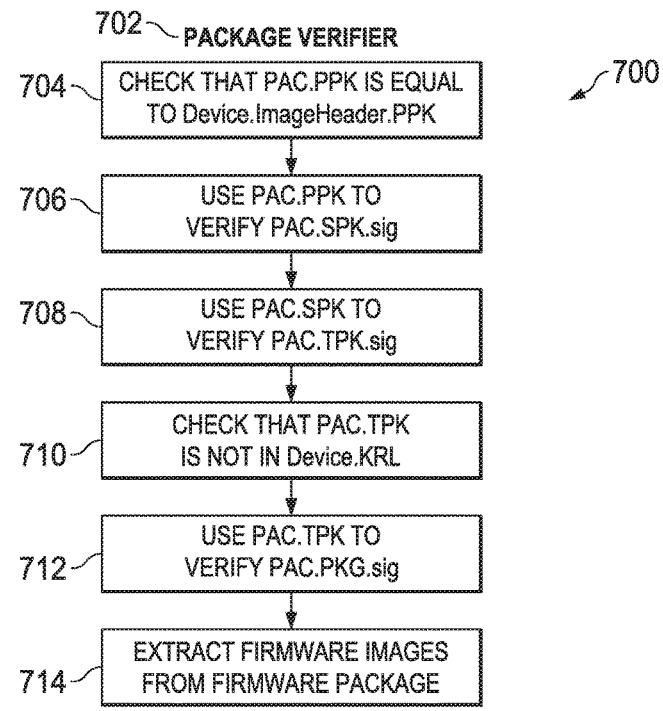
FIGS. 7 and 8 illustrate example methods for firmware package verification according to this disclosure.
Figure 8:
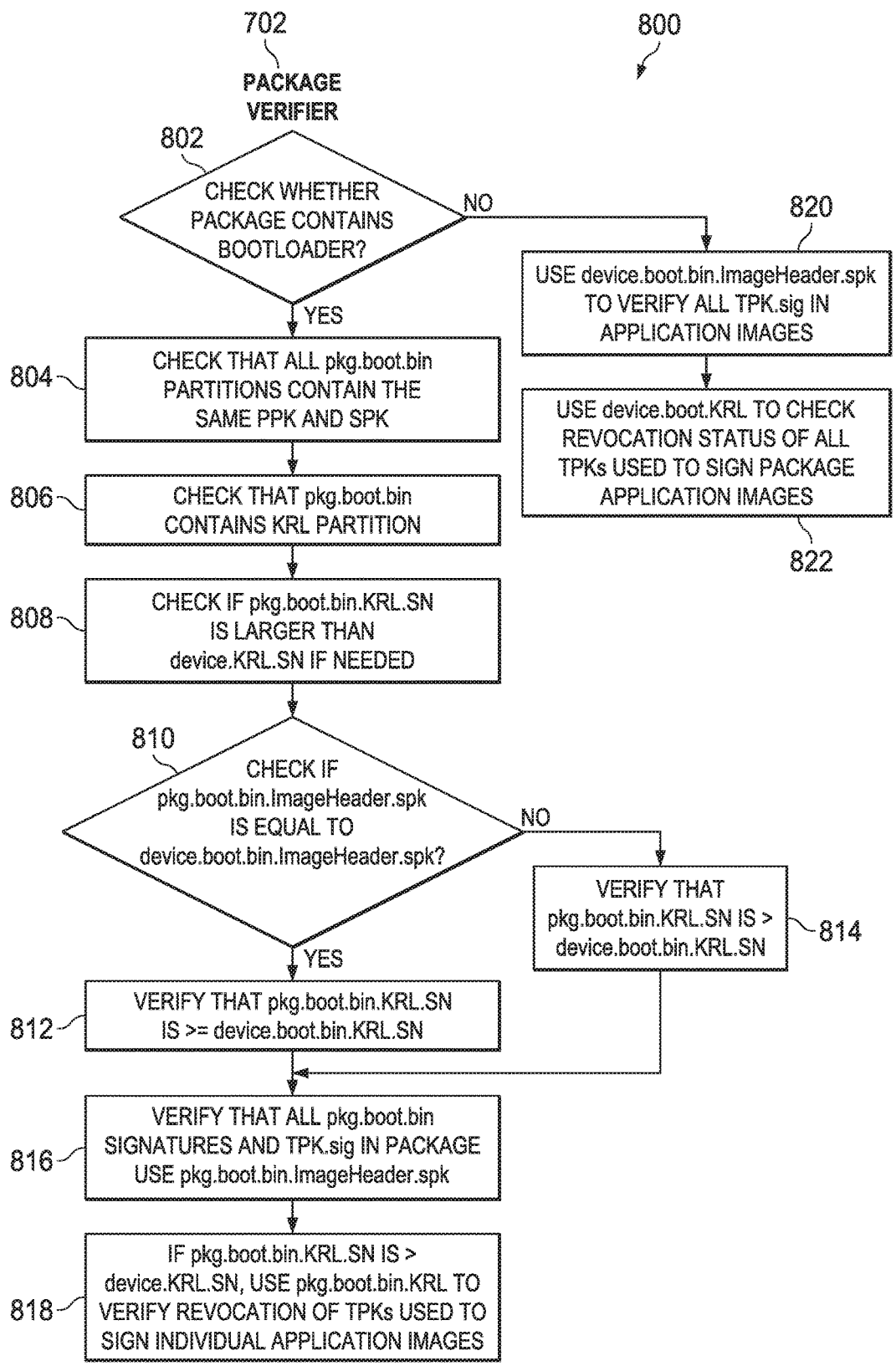

Once a firmware package has been created and signed, the firmware package can be downloaded to devices for use. FIGS. 7 and 8 illustrate example methods 700 and 800 for firmware package verification according to this disclosure. After receipt of a firmware package, a device verifies that the firmware package is valid before installing the images of the firmware package. The device on which firmware is being installed could have the architecture shown in FIG. 2, although certain components in FIG. 2 may be excluded if not needed. Here, a package verifier application 702 is used to verify the firmware package, and the verification can occur in two stages. In stage one shown in FIG. 7, the package authentication certificate is verified. In stage two shown in FIG. 8, all image/partition signatures are verified.

During the first stage of the verification process, the package verifier application 702 uses the primary public key from the device bootloader as a root of trust. The package verifier application checks that the primary public key in the package authentication certificate of a firmware package matches the device's own primary public key at step 704. This could include, for example, the processor 202 of the device checking whether PAC.PPK equals the device's primary public key in the image header of the device's current firmware, which is denoted Device.ImageHeader.PPK. If so, the primary public key is used to verify the signature of the secondary public key in the package authentication certificate at step 706. This could include, for example, the processor 202 of the device using PAC.PPK to verify PAC.SPK.sig. If verified, the secondary public key is used to verify the signature of a tertiary public key in the package authentication certificate at step 708. This could include, for example, the processor 202 of the device using PAC.SPK to verify PAC.TPK.sig. The primary public key is therefore used to verify the secondary and tertiary public keys.

The package verifier application checks that the tertiary public key in the package authentication certificate is not in the device's key revocation list at step 710. This could include, for example, the processor 202 of the device searching a Flash-stored or other key revocation list for the tertiary public key. Assuming the tertiary public key has not been revoked, the tertiary public key is used to verify the signature of the firmware package at step 712. This could include, for example, the processor 202 of the device verifying the PKG.sig signature using the (unrevoked) tertiary public key. Once all of the verifications have been completed successfully, one or more firmware images are extracted from the firmware package at step 714. This could include, for example, the processor 202 of the device unzipping the zipped firmware images 502 from the firmware package 500.

At this point, the package verifier application is used to check the signature of each individual image within the firmware package. This occurs during the stage two verification process shown in FIG. 8. In the following description, pkg.boot.bin.KRL is used to denote the key revocation list that is part of the boot.bin file extracted from the firmware package, device.boot.bin.ImageHeader.spk is used to denote the secondary public key that is in the authentication certificate of the image header of the currently-running bootloader, and so on. The stage two verification process also checks for a change in the secondary public key, which can result in a new key revocation list being created as described in more detail below.

As shown in FIG. 8, the package verifier application checks whether a firmware package includes a bootloader at step 802. In some cases (such as in production packages), the firmware package 500 may include one or more application images without any bootloader images. This may include, for example, the processor 202 of the device checking if the firmware images 502 obtained from the firmware package 500 include any boot.bin files.

If so, the package verifier application checks whether all partitions in the firmware package contain the same primary public key and secondary public key at step 804. This could include, for example, the processor 202 of the device checking whether all pkg.boot.bin partitions contain the same PPK and SPK values in their authentication certificates. The package verifier application also checks whether the partitions in the firmware package contain a KRL partition at step 806. This could include, for example, the processor 202 of the device checking whether the firmware package contains a pkg.boot.bin.KRL partition. Assuming the firmware package contains a KRL partition, the package verifier application checks if the serial number of the KRL partition is larger than the serial number of the device's own key revocation list at step 808. This could include, for example, the processor 202 of the device checking whether pkg.boot.bin.KRL.SN is larger than the serial number of the device's key revocation list.

The package verifier application checks if the secondary public key in the firmware package is the same as the secondary public key used by the device at step 810. This could include, for example, the processor 202 of the device checking whether pkg.boot.bin.ImageHeader.spk is equal to device.boot.bin.ImageHeader.spk. As noted above, a change in the secondary public key causes the device to reset its key revocation list. If the secondary public key has not changed, the package verifier application verifies that the serial number of the firmware package's KRL is greater than or equal to the serial number of the device's KRL at step 812. If the secondary public key has changed, the package verifier application verifies that the serial number of the firmware package's KRL is greater than the serial number of the device's KRL at step 814. Both of these verifications ensure that the firmware package 500 does not contain an out-of-date KRL.

Assuming that the verification at step 812 or 814 is successful, the package verifier application verifies all signatures of the partitions and the tertiary public key's signature using the appropriate secondary public key at step 816. This could include, for example, the processor 202 of the device checking verifying that the pkg.boot.bin signatures and the TPK.sig signatures in the firmware package 500 were generated with the secondary secret key using the secondary public key pkg.boot.bin.ImageHeader.spk. This helps to ensure that each individual image in the firmware package 500 is valid. If the serial number of the firmware package's KRL is larger than the serial number of the device's KRL, the package verifier application uses the firmware package's KRL to verify whether there is any revocation of the tertiary public keys used to sign individual application images at step 818. This allows the device to verify whether any tertiary keys being used are contained in an updated key revocation list.

If the firmware package contains no bootloader at step 802, the package verifier application uses the device's secondary public key to verify tertiary public key signatures in the application images at step 820. The package verifier application also uses the device's key revocation list to check the revocation status of the tertiary public keys used to sign the application images at step 822.

However the images in the firmware package 500 are verified, the images can be stored on the device once verified. Because of the verification process shown in FIGS. 7 and 8, users can be more certain that valid firmware is being sent to their devices. Moreover, the ability to sign bootloader images separate from application images enables the secondary keys to be replaced when needed and the tertiary keys to be revoked when needed.

Note that this process ensures only a bootloader with the same or newer KRL can be flashed to or otherwise stored in the device. As a result, an attacker could not revert the device to an earlier firmware with an outdated KRL in order to facilitate a subsequent attack. Moreover, step 814 here is based on the fact that, if the secondary key pair has changed (and thus the package contains a bootloader signed with new secondary secret key), a new KRL has to be generated. When that occurs, each application partition in the package has to be signed by a tertiary secret key with a TPK.sig signature signed by the new secondary secret key.

Figure 9:
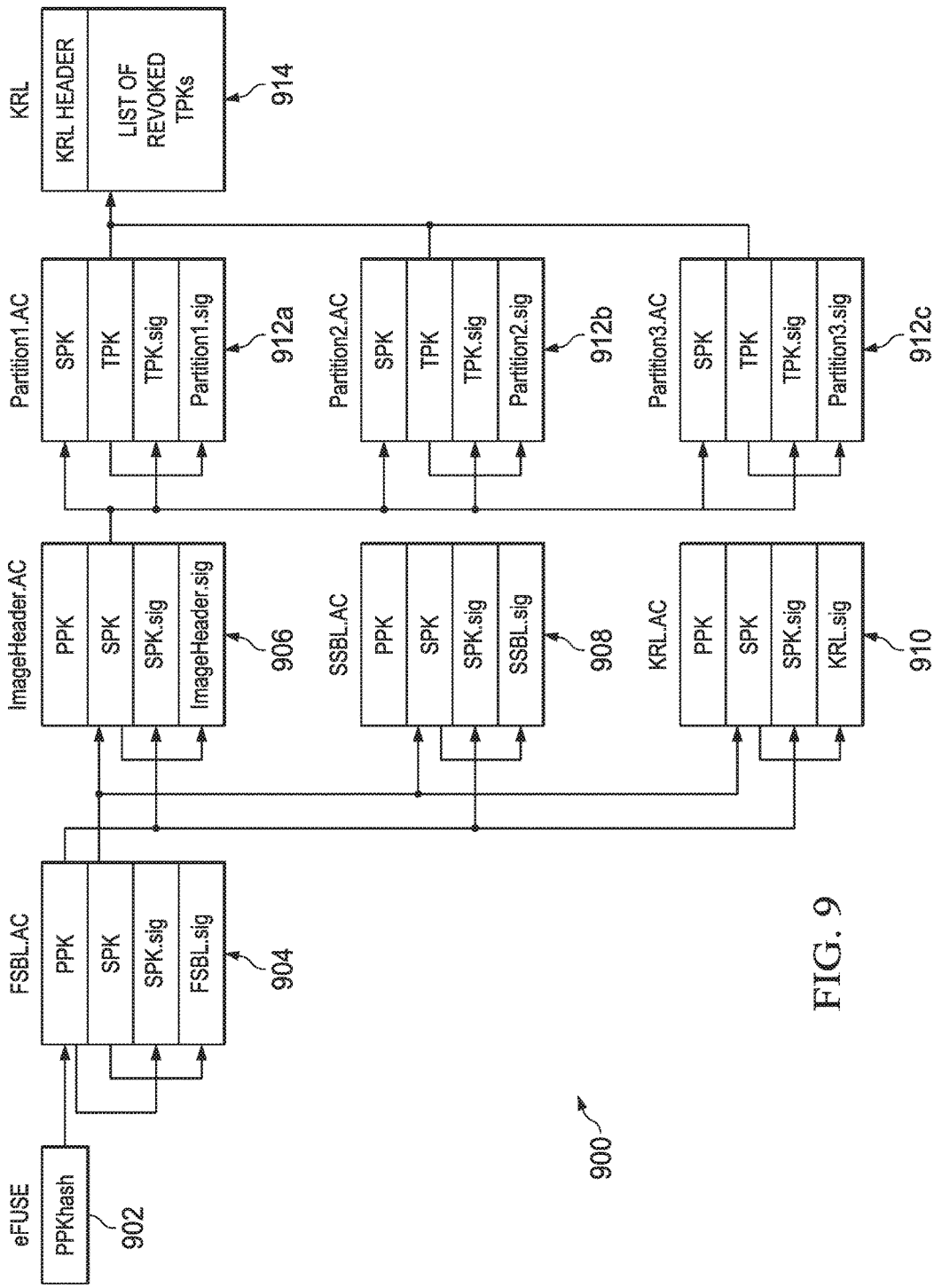
FIG. 9 illustrates an example method for performing a secure boot of a computing device according to this disclosure.

FIG. 9 illustrates an example method 900 for performing a secure boot of a computing device according to this disclosure. The method 900 could, for example, be performed by the device whose firmware was updated according to the methods described above.

During the boot process, the integrity of individual partitions and their related keys are verified as follows. BootROM code hashes the primary public key in an authentication certificate 904 of the first-stage bootloader and compares the result with the hash value stored in the device's eFuse 902. This could include, for example, the processor 202 of the device hashing FSBL.AC.PPK and comparing the result with eFUSE.PPKhash. The BootROM code also verifies the signature of the secondary public key in the authentication certificate 904 of the first-stage bootloader using the primary public key in the authentication certificate 904 of the first-stage bootloader. This could include, for example, the processor 202 of the device verifying FSBL.AC.SPK.sig using FSBL.AC.PPK. In addition, the BootROM code verifies the signature of the first-stage bootloader itself using the secondary public key of the first-stage bootloader. This could include, for example, the processor 202 of the device verifying FSBL.sig using FSBL.SPK. Assuming all verifications are successful, the BootROM code hands over control to the first-stage bootloader.

The first-stage bootloader verifies that the secondary public key in an authentication certificate 906 of the image header of the device's firmware matches the secondary public key of the first-stage bootloader. This could include, for example, the processor 202 of the device verifying that ImageHeader.SPK equals FSBL.SPK. The first-stage bootloader also verifies that the signature of the secondary public key in the authentication certificate 906 is valid using the primary public key. This could include, for example, the processor 202 of the device verifying that ImageHeader.SPK.sig is valid using FSBL.PPK. The first-stage bootloader further verifies that the signature of the image header itself is valid using the secondary public key of the image header. This could include, for example, the processor 202 of the device verifying that ImageHeader.sig is valid using ImageHeader.SPK.

The first-stage bootloader verifies that the secondary public key in an authentication certificate 908 of the second-stage bootloader matches the secondary public key used by the first-stage bootloader. This could include, for example, the processor 202 of the device verifying that SSBL.SPK matches FSBL.SPK. The first-stage bootloader also verifies that the signature of the second-stage bootloader's secondary public key in the authentication certificate 908 is valid using the first-stage bootloader's primary public key. This could include, for example, the processor 202 of the device verifying that SSBL.SPK.sig is valid using FSBL.PPK. The first-stage bootloader further verifies that the signature of the second-stage bootloader itself is valid using the second-stage bootloader's secondary public key. This could include, for example, the processor 202 of the device verifying that SSBL.sig is valid using SSBL.SPK.

The first-stage bootloader verifies that the secondary public key in an authentication certificate 910 of a key revocation list matches the secondary public key used by the first-stage bootloader. This could include, for example, the processor 202 of the device verifying that KRL.SPK matches FSBL.SPK. The first-stage bootloader also verifies that the signature of the key revocation list's secondary public key in the authentication certificate 910 is valid using the first-stage bootloader's primary public key. This could include, for example, the processor 202 of the device verifying that KRL.SPK.sig is valid using FSBL.PPK. The first-stage bootloader further verifies that the signature of the key revocation list itself is valid using the key revocation list's secondary public key. This could include, for example, the processor 202 of the device verifying that KRL.sig is valid using KRL.SPK. Assuming all verifications are successful, the first-stage bootloader hands over control to the second-stage bootloader.

For each application partition, the second-stage bootloader verifies that the partition's secondary public key in that partition's authentication certificate 912a-912c matches the image header's secondary public key. This could include, for example, the processor 202 of the device verifying that PartitionX.SPK matches ImageHeader.SPK. The second-stage bootloader also verifies the partition's tertiary public key is not listed in a key revocation list 914. This could include, for example, the processor 202 of the device verifying that PartitionX.TPK is not listed in the key revocation list 914. The second-stage bootloader further verifies the signature of the partition's tertiary public key using the image header's secondary public key. This could include, for example, the processor 202 of the device verifying that PartitionX.TPK.sig is valid using ImageHeader.SPK. In addition, the second-stage bootloader verifies the signature of the partition itself using the partition's tertiary public key. This could include, for example, the processor 202 of the device verifying that PartitionX.sig is valid using PartitionX.TPK.

If any of the verifications in FIG. 9 fail, the boot process can enter a fallback mode. Note here that each bootloader partition could be signed by a different secondary secret key. Also note that the second-stage bootloader uses the image header's secondary public key (ImageHeader.SPK) to authenticate all application partitions. In addition, note that each application partition could be signed by a different tertiary public key and that fewer than three or more than three application partitions could be present.

Figure 10:
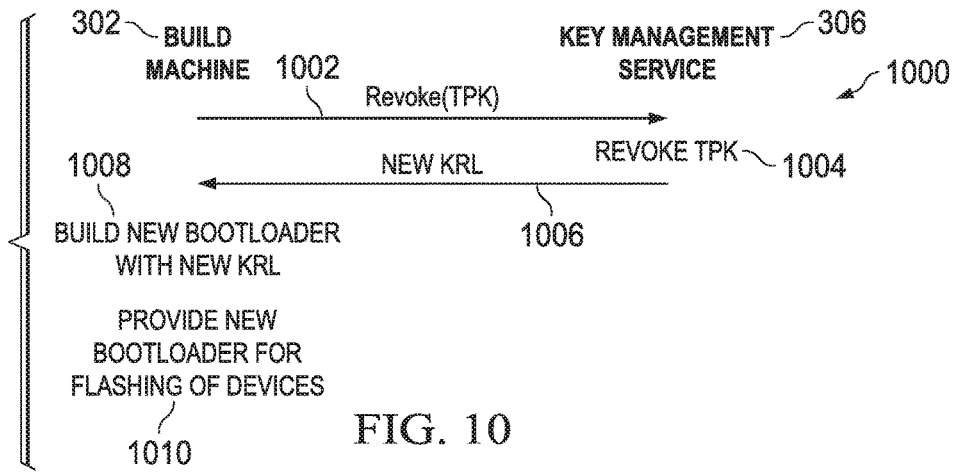
FIG. 10 illustrates an example method for revoking a tertiary public key according to this disclosure.

FIG. 10 illustrates an example method 1000 for revoking a tertiary public key according to this disclosure. The method 1000 could, for example, be performed using the build machine 302 and the key management service 306. As shown in FIG. 10, a tertiary public key is revoked by calling a function of the key management service at step 1002. This could include, for example, the processor 202 of the build machine 302 sending a request identifying a specific tertiary public key to the key management service 306. The request causes the key management service 306 to revoke the tertiary public key and mark it as such in the key management service's database at step 1004. This also causes the key management service 306 to add the tertiary public key to a new key revocation list, which is published to the build machine at step 1006. The new key revocation list could have an incremented serial number as described above.

The build machine then builds a new bootloader using the new key revocation list at step 1008. This could include, for example, performing the techniques described above to build a new bootloader, sign the new bootloader, and include the new bootloader in a signed firmware package. The new bootloader is provided for use in flashing or otherwise reprogramming devices at step 1010. This could include, for example, performing the techniques described above to verify and load the new firmware package. Afterwards, each device that has the new key revocation list with the incremented serial number will refuse to execute any application partition signed by the revoked tertiary public key.

Figure 11:
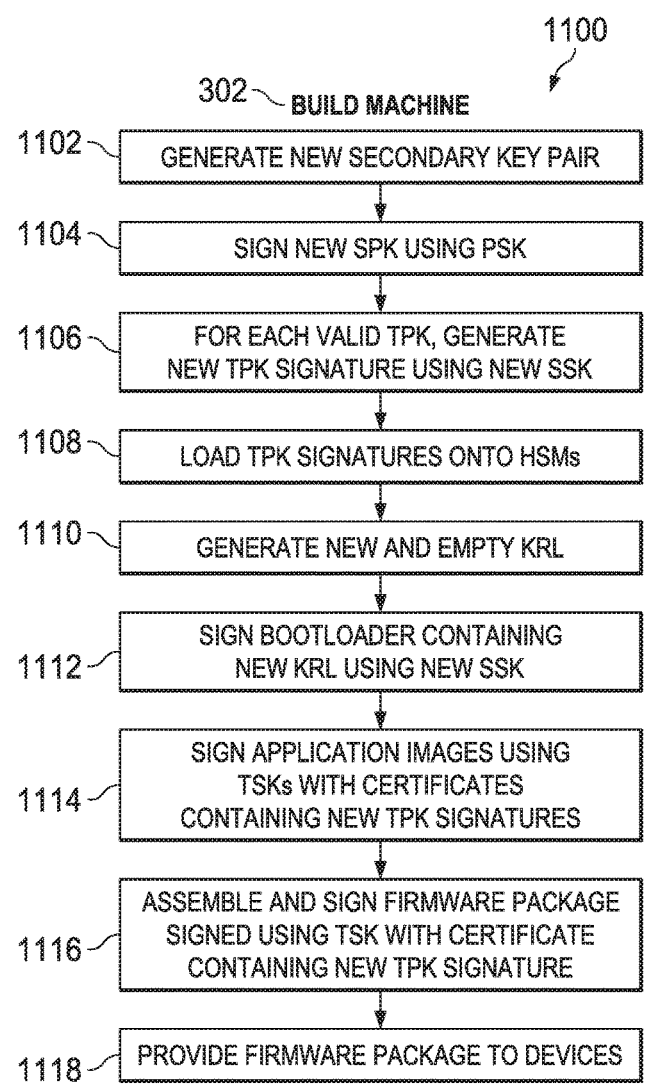
FIG. 11 illustrates an example method for exchanging secondary keys according to this disclosure.

FIG. 11 illustrates an example method 1100 for exchanging secondary keys according to this disclosure. As noted above, the primary keys cannot be changed since a hash of the primary public key can be burned into a device (such as in an eFUSE). However, secondary key pairs (SSK/SPK) can change. One reason for such a change could be that the number of revoked tertiary public keys is approaching the maximum number of revoked keys in a key revocation list.

As shown in FIG. 11, a new secondary key pair is generated at step 1102. This could include, for example, the processor 202 of the build machine 302 interacting with the key management service 306 to generate a new secondary key pair (SSK2/SPK2). The new secondary public key is signed by the primary secret key at step 1104. This could include, for example, the processor 202 of the build machine 302 signing SPK2 using PSK to produce a signature SPK2.sig. For each valid (non-revoked) tertiary public key, a new tertiary public key signature is generated at step 1106. This could include, for example, the processor 202 of the build machine 302 signing each TPK using SSK2. The new tertiary public key signatures are uploaded to respective hardware security modules at step 1108. This could include, for example, the processor 202 of the build machine 302 uploading each new TPK signature to a smart card. The result of this is that each tertiary public key certificate TPK.cert is updated based on the new secondary key pair.

A new (and empty) key revocation list is generated at step 1110, and a new bootloader containing the new key revocation list is generated at step 1112. The new bootloader is signed using the new secondary secret key, meaning all bootloader partitions are signed using the new secondary secret key. Device application images are signed using one or more tertiary public keys at step 1114. This could include, for example, the processor 202 of the build machine 302 signing each application image with a tertiary public key having an updated certificate TPK.cert (which contains a new tertiary public key signature TPK.sig signed using the new secondary secret key). A new firmware package containing the new bootloader and all other images is assembled and signed with a tertiary public key at step 1116. This could include, for example, the processor 202 of the build machine 302 assembling a new firmware package as described above and signing the new firmware package with a tertiary public key having an updated certificate TPK.cert (which contains a new tertiary public key signature TPK.sig signed using the new secondary secret key). The firmware package is provided for download to devices at step 1118.

Note that once the bootloader with the new secondary public key is flashed to a device, the device boot process cannot verify any package containing a TPK.sig signature signed by the old secondary secret key. As a result, the firmware package with the updated bootloader signed by the new secondary secret key contains all freshly-signed firmware images for that device. Moreover, the key revocation list is empty since all tertiary key signatures generated using the old secondary secret key can no longer be verified.

Although FIGS. 3 through 11 illustrate example methods and related details for secure in-band upgrade using key revocation lists and certificate-less asymmetric tertiary key pairs, various changes may be made to FIGS. 3 through 11. For example, various steps of each method could overlap, occur in parallel, occur in a different order, or occur any number of times. Also, while specific functions have been described as being performed by specific devices, this is for illustration only. Any suitable device or combination of devices could be used to perform the methods described above.

In conclusion, this patent document has described how digitally signed firmware and secure boot capabilities can help to mitigate a number of software/firmware exploits, such as bootkits, rootkits, and virus attacks, by disallowing the execution of unauthorized code. This can be achieved by extending secure boot capabilities to all modules during load and prior to execution. Further robustness of the secure boot security solution can be obtained by segregating the signing of a bootloader from the signing of the rest of the firmware (kernel/user applications), supporting a method to revoke tertiary keys, limiting the KRL size by allowing a secondary key rollover capability, and reducing or preventing the distribution of symmetric keys in devices.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for securely booting a device comprising: securely booting a device using a bootloader, the bootloader being digitally signed using a first cryptographic key associated with the bootloader; executing one or more kernel or user applications using the device, the one or more kernel or user applications being digitally signed using one or more second cryptographic keys associated with the one or more kernel or user applications; and using an in-band channel to update or replace the first cryptographic key via a key revocation list included with the bootloader and certificate-less asymmetric tertiary key pairs;
wherein: the bootloader comprises a partition comprising a first-stage bootloader and a second-stage bootloader; and securely booting the device further comprises executing bootROM code to verify the first-stage bootloader and executing the first-stage bootloader to verify the second-stage bootloader;
wherein: the first cryptographic key used to digitally sign the bootloader is a secondary secret key; authentication certificates for the first-stage and second-stage bootloaders comprise a secondary public key associated with the secondary secret key; the one or more second cryptographic keys used to digitally sign the one or more kernel or user applications are one or more tertiary secret keys stored on a Hardware Security Module (HSM); and one or more authentication certificates for the one or more kernel or user applications comprise one or more tertiary public keys associated with the one or more tertiary secret keys, wherein at least one signature is placed within the one or more authentication certificates of an image header and the partition and wherein the certificate-less asymmetric tertiary key pairs comprise the one or more tertiary secret keys and the one or more tertiary public keys;
wherein the securely booting the device further comprises: verifying a primary public key in the authentication certificate for the first-stage bootloader using the primary public key or a hash of the primary public key stored in the device; verifying a signature of the secondary public key in the authentication certificate for the first-stage bootloader using the primary public key; and verifying a signature of the first-stage bootloader in the authentication certificate for the first-stage bootloader using the secondary public key.

2. The method of claim 1, wherein securely booting the device further comprises: verifying a signature of the secondary public key in the authentication certificate for the second-stage bootloader using the primary public key; and verifying a signature of the second-stage bootloader in the authentication certificate for the second-stage bootloader using the secondary public key.

3. The method of claim 2, wherein securely booting the device further comprises, for each kernel or user application: verifying a signature of the associated tertiary public key in the authentication certificate for the kernel or user application using the secondary public key; and verifying a signature of the kernel or user application in the authentication certificate for the kernel or user application using the associated tertiary public key.

4. The method of claim 1, further comprising: using a key revocation list included with the bootloader to revoke at least one of the one or more second cryptographic keys, wherein a number of revoked tertiary keys listed in the key revocation list is upper bounded with an upper bound to provide a maximum size for the revocation list; and wherein when the number of revoked tertiary keys approaches or reaches the upper bound, a key pair of the first cryptographic key is changed to clear out the key revocation list.

5. The method of claim 4, further comprising: receiving the key revocation list from a build machine; limiting a size of the key revocation list by rolling-over the first cryptographic key; and verifying with a sign server service when the key revocation list received from the build machine matches a key revocation list received from a key management service.

6. The method of claim 1, wherein: using the in-band channel to update or replace the first cryptographic key comprises loading a new firmware package on the device, the new firmware package comprising a new first cryptographic key and an empty key revocation list, the empty key revocation list included with the bootloader; and the new first cryptographic key is digitally signed by a primary secret key.

7. A system for securely booting a device comprising: at least one memory configured to store a bootloader and one or more kernel or user applications, the bootloader digitally signed using a first cryptographic key associated with the bootloader, the one or more kernel or user applications digitally signed using one or more second cryptographic keys associated with the one or more kernel or user applications; and at least one processor configured to: securely boot the system using the bootloader; execute the one or more kernel or user applications; and use an in-band channel to update or replace the first cryptographic key via a key revocation list and certificate-less asymmetric tertiary key pairs;
wherein: the bootloader comprises a first-stage bootloader and a second-stage bootloader; and to securely boot the device, the at least one processor is further configured to execute bootROM code to verify the first-stage bootloader and execute the first-stage bootloader to verify the second-stage bootloader;
wherein: the first cryptographic key used to digitally sign the bootloader is a secondary secret key; authentication certificates for the first-stage and second-stage bootloaders comprise a secondary public key associated with the secondary secret key; the one or more second cryptographic keys used to digitally sign the one or more kernel or user applications are one or more tertiary secret keys stored on a Hardware Security Module (HSM); and one or more authentication certificates for the one or more kernel or user applications comprise one or more tertiary public keys associated with the one or more tertiary secret keys, wherein at least one signature is placed within the one or more authentication certificates of an image header and the partition and wherein the certificate-less asymmetric tertiary key pairs comprise the one or more tertiary secret keys and the one or more tertiary public keys;
wherein, to securely boot the device, the at least one processor is further configured to: verify a primary public key in the authentication certificate for the first-stage bootloader using the primary public key or a hash of the primary public key stored in the device; verify a signature of the secondary public key in the authentication certificate for the first-stage bootloader using the primary public key; and verify a signature of the first-stage bootloader in the authentication certificate for the first-stage bootloader using the secondary public key.

8. The system of claim 7, wherein, to securely boot the device, the at least one processor is further configured to: verify a signature of the secondary public key in the authentication certificate for the second-stage bootloader using the primary public key; and verify a signature of the second-stage bootloader in the authentication certificate for the second-stage bootloader using the secondary public key.

9. The system of claim 8, wherein, to securely boot the device, the at least one processor is configured, for each kernel or user application, to: verify a signature of the associated tertiary public key in the authentication certificate for the kernel or user application using the secondary public key; and verify a signature of the kernel or user application in the authentication certificate for the kernel or user application using the associated tertiary public key.

10. The system of claim 7, wherein the at least one processor is further configured to: use a revocation list included with the bootloader to revoke at least one of the one or more second cryptographic keys, wherein a number of revoked tertiary keys listed in the key revocation list is upper bounded with an upper bound to provide a maximum size for the revocation list; and wherein when the number of revoked tertiary keys approaches or reaches the upper bound, a key pair of the first cryptographic key is changed to clear out the key revocation list.

11. The system of claim 10, wherein the at least one processor is further configured to: receive the key revocation list from a build machine; limit a size of the key revocation list in response to a roll-over of the first cryptographic key; and verify with a sign server service when the key revocation list received from the build machine matches a key revocation list received from a key management service.

12. The system of claim 7, wherein: to use the in-band channel to update or replace the first cryptographic key, the at least one processor is configured to load a new firmware package comprising a new first cryptographic key and an empty key revocation list, the empty key revocation list included with the bootloader; and the new first cryptographic key is digitally signed by a primary secret key.

13. A non-transitory computer readable medium for securely booting a device containing instructions that when executed cause at least one processor to: securely boot a device using a bootloader, the bootloader being digitally signed using a first cryptographic key associated with the bootloader; execute one or more kernel or user applications using the device, the one or more kernel or user applications being digitally signed using one or more second cryptographic keys associated with the one or more kernel or user applications; and use an in-band channel to update or replace the first cryptographic key via a key revocation list and certificate-less asymmetric tertiary key pairs;

Wherein: the bootloader comprises a first-stage bootloader and a second-stage bootloader; and to securely boot the device, the at least one processor is further configured to execute bootROM code to verify the first-stage bootloader and execute the first-stage bootloader to verify the second-stage bootloader;

wherein: the first cryptographic key used to digitally sign the bootloader is a secondary secret key; authentication certificates for the first-stage and second-stage bootloaders comprise a secondary public key associated with the secondary secret key; the one or more second cryptographic keys used to digitally sign the one or more kernel or user applications are one or more tertiary secret keys stored on a Hardware Security Module (HSM); and one or more authentication certificates for the one or more kernel or user applications comprise one or more tertiary public keys associated with the one or more tertiary secret keys, wherein at least one signature is placed within the one or more authentication certificates of an image header and the partition and wherein the certificate-less asymmetric tertiary key pairs comprise the one or more tertiary secret keys and the one or more tertiary public keys;

wherein, to securely boot the device, the at least one processor is further configured to: verify a primary public key in the authentication certificate for the first-stage bootloader using the primary public key or a hash of the primary public key stored in the device; verify a signature of the secondary public key in the authentication certificate for the first-stage bootloader using the primary public key; and verify a signature of the first-stage bootloader in the authentication certificate for the first-stage bootloader using the secondary public key.

14. The non-transitory computer readable medium of claim 13, wherein the instructions that when executed cause the at least one processor to securely boot the device comprise instructions that when executed cause the at least one processor to: verify a signature of the secondary public key in the authentication certificate for the second-stage bootloader using the primary public key; verify a signature of the second-stage bootloader in the authentication certificate for the second-stage bootloader using the secondary public key; verify a signature of the associated tertiary public key in the authentication certificate for the kernel or user application using the secondary public key; and verify a signature of the kernel or user application in the authentication certificate for the kernel or user application using the associated tertiary public key.

* * * * *